No. 770,833. PATENTED SEPT. 27, 1904.
N. TOBIN.
RANGE FINDER.
APPLICATION FILED MAY 23, 1904.
NO MODEL.

No. 770,833.

Patented September 27, 1904.

UNITED STATES PATENT OFFICE.

NICHOLAS TOBIN, OF PITTSBURG, PENNSYLVANIA.

RANGE-FINDER.

SPECIFICATION forming part of Letters Patent No. 770,833, dated September 27, 1904.

Application filed May 23, 1904. Serial No. 209,324. (No model.)

*To all whom it may concern:*

Be it known that I, NICHOLAS TOBIN, a citizen of the United States, residing at Pittsburg, in the county of Allegheny and State of Pennsylvania, have invented or discovered certain new and useful Improvements in Range-Finders, of which improvement the following is a specification.

In Letters Patent No. 673,099, granted to me April 30, 1901, I have described and claimed certain improvements in range-finders, said improvements consisting, generally stated, in the combination of two movable mirrors arranged one to receive the reflection of the object to be observed from the other, means for imparting angular movements to said mirrors, one at a greater speed than the other, and an indicating mechanism operated in accordance with the movements of the mirrors.

The invention described herein has for its object a construction of apparatus wherein two focusing devices are arranged a distance apart equal to a factor of given base of a right-angle triangle, one of said focusing devices being movable around and angularly with reference to the other, such apparatus including an indicating mechanism operated by or in accordance with the movements of the movable focusing device.

The invention is hereinafter more fully described and claimed.

Figure 1:
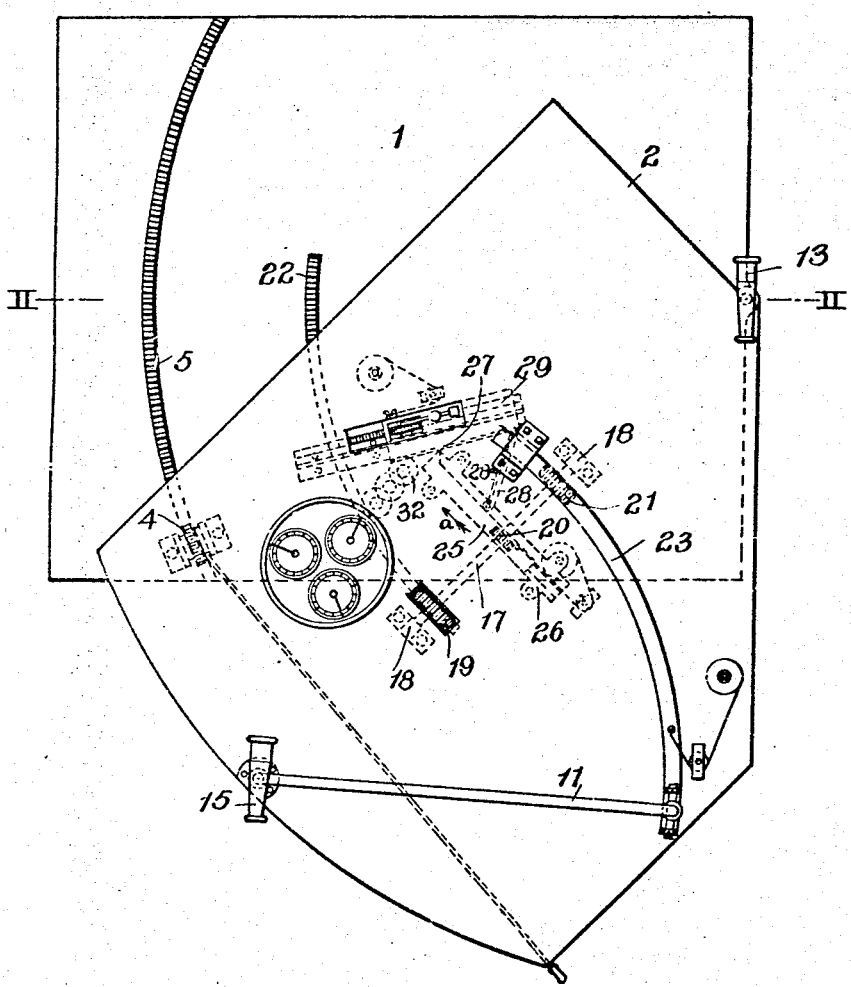
Figure 2:
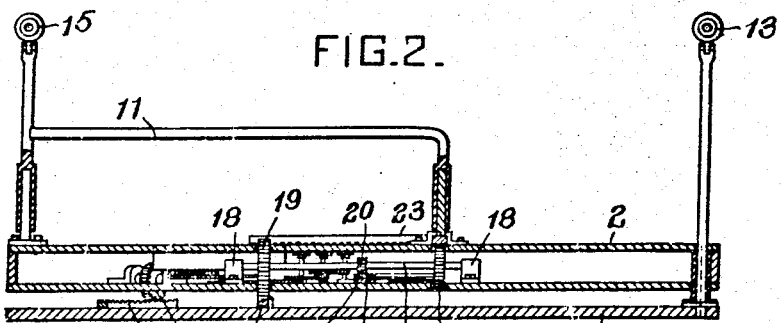

In the accompanying drawings, forming a part of this specification, Figure 1 is a top plan view of my improved range-finder. Fig. 2 is a sectional elevation on a plane indicated by the line II II, Fig. 1, the apparatus being closed.

In the practice of my invention the bed-plate 1 is suitably mounted upon a tripod or other suitable support in such manner that a pointing device 13, such as a spy-glass, may be directed at the object whose distance here is to be determined. A frame 2 is pivotally mounted on the bed-plate 1 in such manner that its axis of motion will be in a vertical plane passing through the axis of the spy-glass or pointer 13. As described in Letters Patent No. 673,099, heretofore referred to, provision is made, by means of driven pinion 4 and rack 5 or other suitable means, for shifting the frame 2 on its pivotal axis. A spy-glass or pointer 15 is mounted with the freedom of horizontal rotation upon the frame 2 a distance from the center of motion of the frame equal to a factor of the given base of the triangle whose apex will be at the point whose distance is to be determined. A horizontal rotation is given to the pointer or spy-glass 15 by means of a rack-bar 23, which is connected to the glass or pointer by an arm 11. On the movement of the frame 2 rotation is imparted to a shaft 17 through the medium of the rack 22 on the bed-plate and a pinion 19 on the shaft 17, mounted in suitable bearings 18 on the frame. On this same shaft is secured a pinion 21, intermeshing with the rack-bar 23. By suitably proportioning the pinions 19 and 21 and by adjusting their positions around the axle with respect to one another and the position of the racks 22 and 23 it is possible to vary the rate of movement of the pointer or spy-glass 15 on its pivotal support with respect to the rate of movement of the frame 2 around its pivotal point to any desired extent. In practice I so adjust these pinions and their racks that the angular movement of the pointer or spy-glass 15 shall exceed the angular movement of the frame 2 on its pivotal point by a certain definite motion, and this excessive movement shall be a relatively small fraction of the angular movement of the frame 2. A third pinion 20 is secured to the shaft 17, so as to engage a rack 25, which is mounted in a guide 26, secured to the under side of the frame 2. As the shaft 17 is rotated by the shifting of the frame 2, the movement of the rack 25 will be proportioned to the movement of the frame, the proportion being dependent upon the sizes of the pinions 19 and 20. The sliding rack 25 is provided at one end with a spur 27, which is made of such a length that its point will, when the rack has been shifted to its extreme outward movement, be immediately above or in alinement with the center of movement of the arm 28. This arm has its inner end pivotally mounted on a suitable support, such as the guide 26 on the frame 2, in suitable relation to the line or path of movement of the rack 25 and has its outer end connected to the slide 29, arranged at an angle with the line of movement of the rack 25. This slide is mounted in guides secured to the under side of the frame 2, as described in Letters Patent heretofore referred to, and is provided with a ledge having its edge toothed to engage a pinion 32, forming a part of a train of gearing for operating the indicating-dials. The slide is also provided with suitable mechanisms for shifting the same, as shown and described in such Letters Patent. The arm 28 is provided on its inner ledge with a rib 28ª, the inner face of which will coincide with the plane passing through the center of the arm. The inner movement of the arm and also that of the dial-actuating slide 29 is regulated by the position of the spur 27 and carried by the rack 25. As the rack is shifted by the frame 2, the movement of the indicating-dials will be proportioned to the movement of the frame.

When using my improved apparatus, the frame 2 is first shifted to a closed position or one in which the pointer or spy-glass 15 will have its axis parallel with the axis of the setting pointer or spy-glass 13. The bed-plate is then adjusted on its standard until the object to be observed can be seen through the spy-glass 13, which, as also the spy-glass 15, is provided with cross-hairs for the accurate adjustment of the mechanism. The position of the table 1 having been fixed, the frame 2 is shifted on its pivotal center. During this movement the observer looking along the spy-glass or pointer 15 permits the movement of frame 2 to continue until the object can be seen along the pointer or through the spy-glass 15. As soon as this occurs the movement of the frame is stopped. By the turning of the frame 2 the rack 25 is moved in the direction of the arrow *a* a distance proportional to the outward movement of the frame. As soon as the movement of the frame is stopped the slide 29 is shifted to the left, actuating the indicating-dials, until stopped by the rib 28ª on the frame 28 striking against the spur 27 on the rack 25. As soon as the movement of the slide 25 is arrested the operator can read the distance of the object observed upon the dials.

My improved range-finder is constructed on the same principle as that shown and described in the Letters Patent referred to—*i. e.*, I take a triangle, preferably a right-angle triangle, having a base which is a multiple of the medial length of the apparatus or the distance between the pivotal centers of the pointers or spy-glasses 13 and 15 and whose apex is at the object—as, for example, if the distance between the centers of movement of the frame 2 and the pointer or spy-glass 15 is two feet the base of the triangle will have a length of seven hundred and twenty feet or any other length in which two is an exact divisor. The spy-glass or pointer 15 is so arranged that when the apparatus is closed it will lie in a plane passing through a reference-point on the table—such, for example, as the edge of such table—and when moved an angular distance from the given point on the base the pivotal center of the spy-glass or pointer 15 will move through the arc of a circle having a certain fixed relation to the arc of the circle extending the angle at the apex of the triangle having the given base. The frame 2 in its movement shifts the spur or stop 27 a distance proportional to its angular movement. The position of the spur 27 determines the movement of the slide 29, which actuates the indicating mechanism of the apparatus. The indicating mechanism is so constructed in accordance with rules known in the art that for every change of position in frame 2 the dial will indicate the corresponding change in the distance of the center of the apparatus to the object.

I claim herein as my invention—

1. A range-finder having a medial length which is a factor of the base of a triangle, in combination with a stationary pointer arranged at one end of the medial length of the finder, a pointer movable around the stationary pointer and angularly with reference to the stationary pointer and a distance-indicating mechanism controlled by the movable pointer, substantially as set forth.

2. A range-finder having in combination a frame movable around a fixed center, a pointer pivotally mounted on the frame at a distance from the center of movement of the frame equal to a factor of a base of a triangle, means operative on the movement of the frame to shift the pointer on its axis and an indicating mechanism operated in accordance with the movements of the frame and pointer, substantially as set forth.

3. A range-finder having in combination a base, provided with a pointer, a frame pivotally mounted on the base, its pivotal center lying in a plane passing through the axis of the pointer, a pointer pivotally mounted on the base, means for shifting the movable pointer independent of the frame, and an indicating mechanism movable independent of but controlled by the movement of the frame, substantially as set forth.

4. A range-finder having in combination a base provided with a pointer, a frame pivotally mounted on the base, its pivotal center lying in a plane passing through the axis of the pointer, a pointer pivotally mounted on the frame, and means imparting different angular movements to the frame and second pointer, substantially as set forth.

In testimony whereof I have hereunto set my hand.

NICHOLAS TOBIN.

Witnesses:
DARWIN S. WOLCOTT,
F. E. GAITHER.